US009002950B2

(12) United States Patent
Schulz et al.

(10) Patent No.: US 9,002,950 B2
(45) Date of Patent: Apr. 7, 2015

(54) METHOD AND SYSTEM TO FILE RELAYED E-MAILS

(75) Inventors: Karsten A. Schulz, Middle Park (AU); Simon M. Stebbins, Murrumba Downs (AU); Kim E. Fuller, Balmoral (AU)

(73) Assignee: SAP SE, Walldorf (DE)

( * ) Notice: Subject to any disclaimer, the term of this patent is extended or adjusted under 35 U.S.C. 154(b) by 2311 days.

(21) Appl. No.: 11/019,606

(22) Filed: Dec. 21, 2004

(65) Prior Publication Data
US 2006/0168036 A1    Jul. 27, 2006

(51) Int. Cl.
*G06F 15/16* (2006.01)
*G06Q 10/10* (2012.01)

(52) U.S. Cl.
CPC .................. *G06Q 10/107* (2013.01)

(58) Field of Classification Search
USPC .......................................... 709/206; 707/102
See application file for complete search history.

(56) References Cited

U.S. PATENT DOCUMENTS

| 6,317,751 | B1 * | 11/2001 | Yeger et al. ............................ 1/1 |
| 6,609,138 | B1 * | 8/2003 | Merriam ................................ 1/1 |
| 6,694,336 | B1 * | 2/2004 | Multer et al. .................. 707/201 |
| 6,725,228 | B1 * | 4/2004 | Clark et al. .................... 707/102 |
| 6,816,885 | B1 * | 11/2004 | Raghunandan ............... 709/206 |
| 6,981,020 | B2 * | 12/2005 | Miloslavsky et al. .......... 709/204 |
| 7,191,252 | B2 * | 3/2007 | Redlich et al. ................. 709/246 |
| 7,203,725 | B1 * | 4/2007 | Gilmour et al. ................ 709/206 |
| 7,337,448 | B1 * | 2/2008 | Dalia et al. ..................... 719/328 |
| 2003/0187937 | A1 * | 10/2003 | Yao et al. ........................ 709/206 |
| 2003/0187938 | A1 * | 10/2003 | Mousseau et al. ............. 709/206 |
| 2004/0006600 | A1 * | 1/2004 | Miller et al. ................... 709/206 |
| 2004/0133645 | A1 * | 7/2004 | Massanelli et al. ............ 709/206 |
| 2004/0199593 | A1 * | 10/2004 | Simpson ......................... 709/206 |
| 2004/0199595 | A1 * | 10/2004 | Banister et al. ................ 709/207 |
| 2005/0015626 | A1 * | 1/2005 | Chasin ............................ 713/201 |
| 2005/0055359 | A1 * | 3/2005 | Kawai et al. ................... 707/100 |
| 2005/0198173 | A1 * | 9/2005 | Evans .............................. 709/206 |
| 2006/0010217 | A1 * | 1/2006 | Sood ............................... 709/206 |
| 2006/0053200 | A1 * | 3/2006 | McCown ........................ 709/206 |
| 2006/0075032 | A1 * | 4/2006 | Jain et al. ....................... 709/206 |
| 2006/0155810 | A1 * | 7/2006 | Butcher .......................... 709/206 |
| 2006/0168057 | A1 * | 7/2006 | Warren et al. .................. 709/206 |

* cited by examiner

*Primary Examiner* — Djenane Bayard
(74) *Attorney, Agent, or Firm* — Schwegman Lundberg & Woessner, P.A.

(57) ABSTRACT

A method and a system to file relayed e-mails is provided. The method includes receiving an e-mail, the e-mail including addressing information in an e-mail header and an the e-mail body. The e-mail is parsed to obtain the addressing information from the e-mail header and the e-mail body, after which the addressing information is extracted from the parsed e-mail. This formation is stored and used to generate a participant list, which is provided to the user. The user relies on this participant list to file e-mails in e-mail folders associated with a participant that the user selects from the participant list. The participant list is presented to a user to enable the user to select a participant from the participant list.

34 Claims, 6 Drawing Sheets

METHOD AND SYSTEM TO FILE RELAYED E-MAILS

TECHNICAL FIELD

The present application relates generally to the technical field of electronic mail or e-mail and, more particularly to a system and method for filing a relayed e-mail.

BACKGROUND

The use of electronic mail or e-mail has increased over the past number of years, in particular due to the use of the Internet and applications such as Microsoft Outlook.

The increase in the e-mails a user receives has necessitated easier means to classify and file e-mails. Many e-mail users feel overwhelmed by the volume of e-mails that arrive in their inboxes, specifically when they do not have enough time to immediately read and act on received e-mails. As the e-mail inbox fills, an undifferentiated mass of e-mails results. Further, certain e-mails of higher importance may become lost in this undifferentiated mass of e-mails.

In order to process and archived e-mails, users of e-mail programs typically create folders (or files) into which they place e-mails. E-mail programs typically provide users with a relatively large degree of flexibility regarding the nature of such folders, and also allow users to create a hierarchy of folders. For example, a user may create folders within which to place the e-mails pertaining to a specific project (e.g., project A) or pertaining to a certain aspect of a work environment (e.g., recruiting). Further, users typically also create folders to prioritize actions with respect to e-mails (e.g., high, medium and low priority response folders).

The categorization and placing of e-mails in appropriate folders becomes a challenge, in and of itself, once a user has created a large number of folders. The problem is exacerbated when the folder structure involves into a hierarchical data structure, with certain folders not being readily visible to a user. Additionally, certain high level employees within a company may employee human assistants that are responsible for the filing of e-mails in appropriate folders within the high level employee's e-mail program. Such an assistant may be faced with the challenge of not being familiar with a folder hierarchy that has been developed by the high level employee. Certain automated systems to attend to the filing of e-mails in appropriate folders have been suggested in the prior art. Many of these systems, however, tend to be overly simplistic or overly complicated.

SUMMARY

According to one embodiment, there is provided a system to file relayed e-mails, the system including:
a parsing module to
parse an e-mail to obtain addressing information from an e-mail header and body, and
extract the addressing information from the parsed e-mail;
a memory to store the addressing information; and
a participant list module to
generate a participant list from the stored addressing information, and
provide the participant list to a user to enable the user to select a participant from the participant list.

According to a further embodiment, there is provided a method to file relayed e-mails, the method including:

receiving an e-mail, the e-mail including addressing information in an e-mail header and an the e-mail body;
parsing the e-mail to obtain addressing information from the e-mail header and the e-mail body;
extracting the addressing information from the parsed e-mail;
storing the addressing information;
generating a participant list from the extracted addressing information; and
providing the participant list to a user to enable the user to select a participant from the participant list.

Other features of the present invention will be apparent from the accompanying drawings and from the detailed description that follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A method and system to file relayed electronic mails or e-mails are described.

Figure 1:
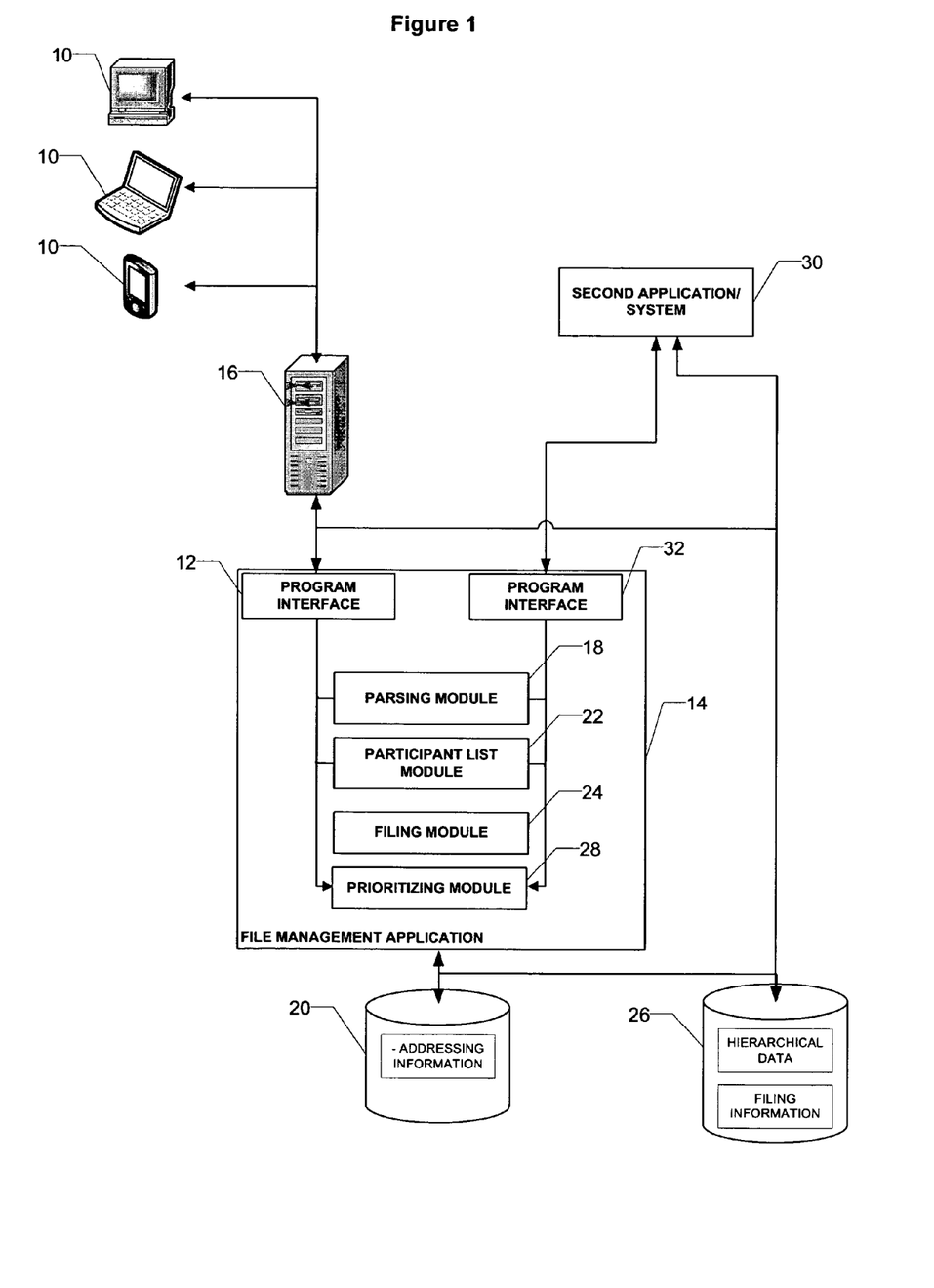
FIG. 1 is a block diagram illustrating the system to file relayed e-mails according to an example embodiment of the present invention.

FIG. 1 illustrates a block diagram of the system according to an example embodiment of the present invention. A number of user computers 10 are shown connected to a mail server 12. The user computers 10 are typically desktops, laptops or handheld devices (e.g., Personal Digital Assistants (PDAs) or smart phones) capable of sending and receiving e-mails. A file management application 14 forms part of the e-mail client programs used on the user computers 10. It would be appreciated that the mail server 12 may also utilize the file management application 14, in which instance the file management application 14 is stored on the mail server 12. A first program interface 16 provides an interface between the file management application 14, the mail server 12 and user computers 10 respectively.

The file management application 14 includes a parsing module 18 for parsing an e-mail and extracting information from the parsed e-mail. In one embodiment, the parsing module 18 obtains addressing information from an e-mail header and body. The addressing information obtained includes at least a sender and recipient's e-mail address obtained from the e-mail header of the e-mail and at least a sender and recipient's e-mail address obtained from at least one header of a previously sent and relayed e-mail located in the e-mail body. Typically the parsing module 18 parses the entire body of the e-mail to obtain all sender and recipient's e-mail addresses, including the e-mail addresses of carbon copy recipients, from headers in the e-mail body. Carbon copy recipients in the header of the e-mail are also included in the addressing information.

The file management application 14 further includes a memory 20 in which the extracted addressing information is stored.

The file management application 14, in one example embodiment, also includes participant list module 22 for generating a participant list from the stored addressing information, and for providing the participant list to a user. The participant list module 22 enables a user to select a participant from the participant list with which content of the e-mail is most closely associated. This selection of the participant is used by a filing module 24 to file the e-mail. The addressing information of the selected participant is linked to associated information, e.g. hierarchical data, which is stored in a first database 26. An example of such a hierarchical database is the LDAP directory of an e-mail client.

The filing module 24 also provides the user with a target list of filing targets for the e-mail. The filing targets, in one example embodiment, are a list of folders maintained in the system for the filing of e-mails, e.g. a list of e-mails folders. The target list is associated and based on the selected participant. Typically, the filing module 24 selects the e-mail folders of the target list from a set of e-mail folders previously selected by the user for the filing of e-mails associated with the selected participant. This filing information linked to addressing information of participants is stored in a database. It will be appreciated that a second database may be used, or alternatively, the first database 26 described above may also be used.

The file management application 14 further provides a prioritizing module 28 for prioritizing stored addressing information relating to a participant. In the example embodiment, the prioritizing module 28 prioritizes the addressing information prior to the participant list being provided to the user. The criteria to prioritize the participant list are described in more detail below.

It will be appreciated that the file management application 14 and its associated databases and memory may also communicate with a second application or system 30 via a second program interface 32. Examples of possible second applications or systems may include a Web client (e.g., a browser), or another thin-client, using which a user may obtain access to e-mail data, or an Enterprise Resource Planning (ERP) system that integrates with the file management application 14.

Figure 2:
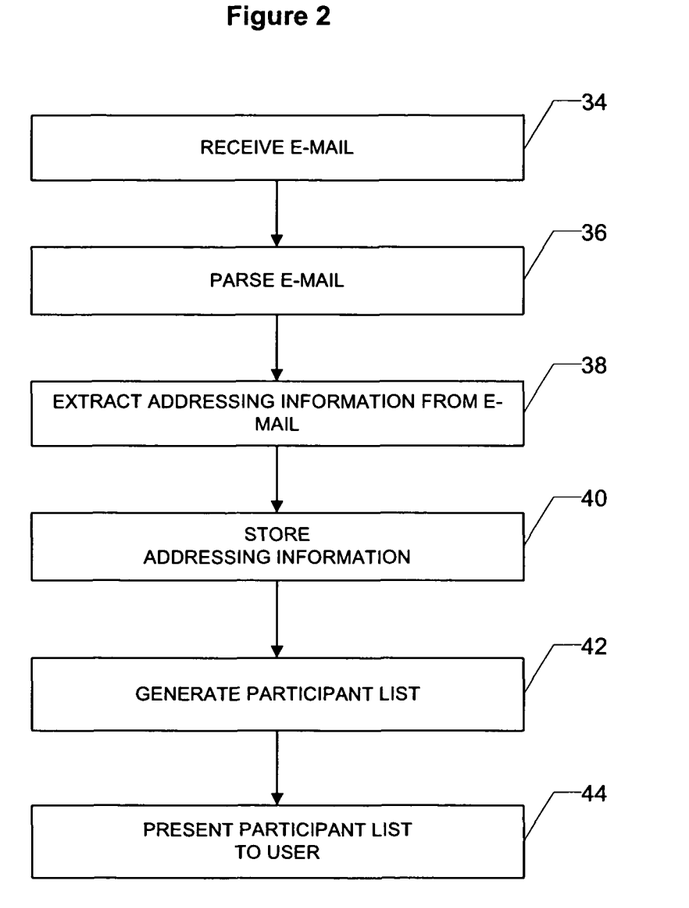
FIG. 2 is a flow diagram of a method for filing relayed e-mails according to a simplified example embodiment of the present invention.

Referring now to FIG. 2, an example embodiment of a simplified method of filing a relayed e-mail according to the present invention is shown. A user receives an e-mail at operation 34 in the user's Inbox. As will be appreciated, the e-mail typically includes addressing information in the e-mail header. The addressing information, as mentioned above, includes at least the e-mail address of a sender, the e-mail address of at least one recipient and may further include an e-mail address or addresses of carbon copy (CC) recipients. Whenever the e-mail has been forwarded or relayed prior to the sender identified in the header of the e-mail receiving the e-mail, addressing information of previous senders and recipients is also included in the e-mail body. An example of the format of a header in an e-mail body is as follows:

From: <name/e-mail address>
Sent: <Time/Date time stamp>
To: <name/e-mail address>
Cc: <name/e-mail address>
Subject: <string>

At operation 36, the e-mail is parsed by the parsing module 18 to obtain addressing information from the e-mail header and the e-mail body. At operation 38, the addressing information is extracted from the parsed e-mail and the information is then stored in memory as shown by operation 40.

The method continues at operation 42 with the generation of a participant list from the extracted addressing information. As will be appreciated, each sender and/or recipient is a participant in the e-mail if the respective sender and/or recipient's e-mail address has been extracted from either the e-mail header or the e-mail body.

As shown in FIG. 2, the method ends at operation 44 with the presentation of the participant list to a user to enable the user to select a participant from the participant list. As described below, this selected participant forms the basis of filing the e-mail with the participant typically being associated with relevant e-mail folders.

Figure 3A:
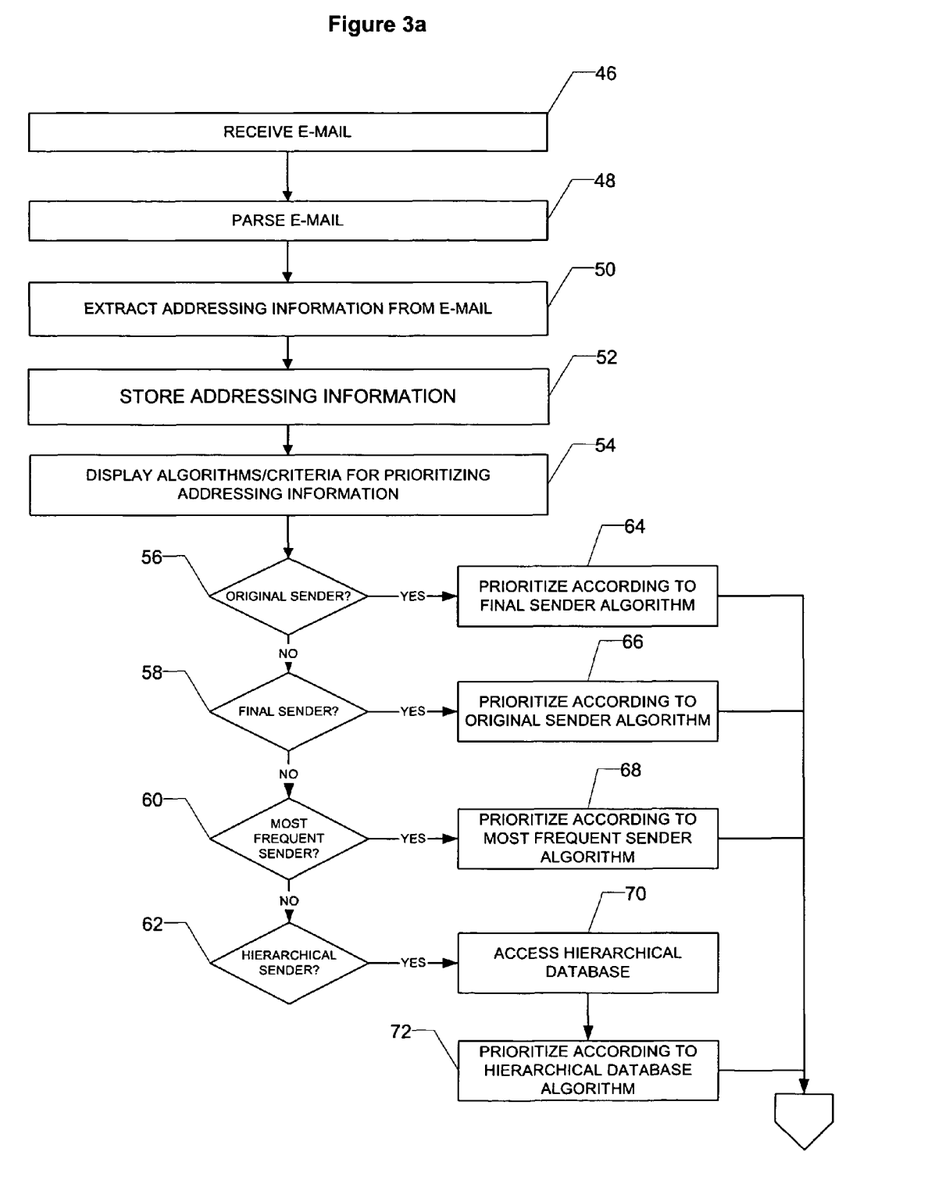
FIGS. 3a and 3b are further flow diagrams of the method for filing relayed e-mails according to a detailed example embodiment of the present invention.
Figure 3B:
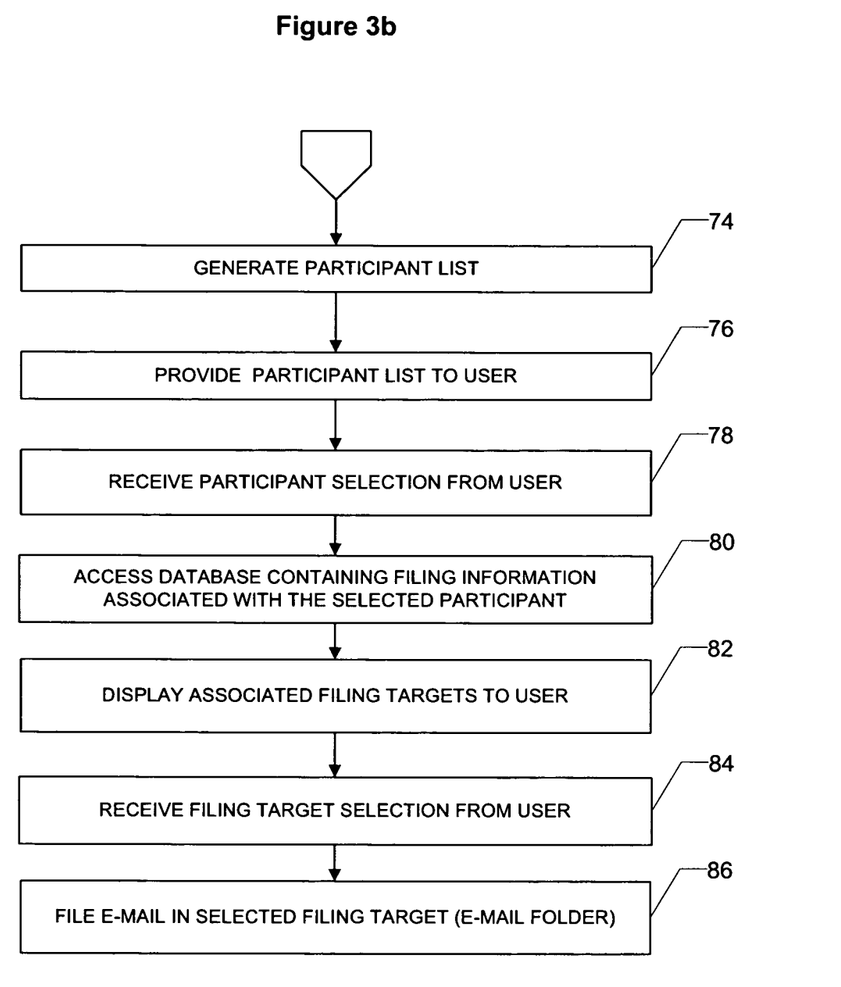

Turning now to FIGS. 3a and 3b, the example embodiment of FIG. 2 is described in more detail. Operations 46 to 52 are similar to those described above, with the method starting at operation 46 with the receipt of an e-mail in the user's Inbox. The e-mail is parsed at operation 48 to obtain addressing information from the e-mail header and the e-mail body and the addressing information is extracted from the parsed e-mail at operation 50, after which, at operation 52, the information is stored in memory as a participant list. As mentioned, each sender and/or recipient's e-mail address extracted from the e-mail header and body is included in the participant list.

To enhance the characteristics of the method of filing relayed e-mails, the participant list is typically sorted according to predetermined prioritizing criteria. In one embodiment, when the user attempts to move an e-mail to a filing target (e.g., an e-mail folder), the user is prompted to select preferred prioritizing criteria. In another embodiment, the prioritizing criteria may be specified by configuration information stored by the prioritizing module 28. Accordingly, at operation 54 the user is provided with this list of pre-determined criteria to enable the prioritizing of the participant list. The selected criterion is received from the user (or retrieved from memory) at operations 52, 54, 56 and 58. Examples of prioritizing criteria include a "sender" chronology. In one scenario, a chronological list of senders identified in the e-mail may be presented, where a high priority is provided to the "most recent" sender in the chronology of senders (operation 64).

Alternatively, a high priority may be attributed to an original sender (e.g., the sender that initiated an e-mail communication chain) in the chronology of senders (operation 66). This prioritizing criterion may be more appropriate, in certain situations, as the participant who sent the last e-mail (the "most recent" sender) may be the person who made the decision but the original sender of the e-mail may be a participant with a special interest in the matter to which the e-mail relates, and may thus be specified as having a high priority than the "most recent" sender.

Other prioritizing criteria include identifying a sending frequency for each sender identified in the e-mail and then prioritizing the participant list according to this sending frequency of the respective senders (operation 68). Sending frequency is helpful as it indicates a special interest and particular involvement of a participant in the e-mail. A further prioritizing criterion may the hierarchical position of a particular sender within an organization. For example, a database may be accessed (operation 70) that contains hierarchical data linking the e-mail addresses stored in the memory to hierarchical positions. For example, a participant's hierarchical position in a company may be CEO, partner, associate, assistant etc. and the participant list is then prioritized according to this hierarchical data at operation 72.

Once the user has selected the preferred criteria, the stored participant list is prioritized accordingly and a prioritized participant list is generated at operation 74. This prioritized participant list is now presented to the user, as shown at operation 76, to enable the user to select the participant most relevant to the e-mail. The participant selected by the user is received at operation 78.

An analysis is now performed with respect to the participant the user has selected for filing the e-mail. In practice, each participant may be associated with filing information, in particular filing targets, such as e-mail folders. For example, a participant may be linked to filing targets related to the participant's hierarchical position in a company, to filing targets related to projects the participant is working on, committees the participant is a member of or other general interests of the participant. At operation 80, a second database is accessed that contains this filing information associated with the selected participant and links the associated filing information with the addressing information of the selected participant.

The filing targets is provided to the user at operation 82 to enable the user to select the particular filing target or folder the e-mail should be stored in. Once this selection is received at operation 84, the e-mail is stored in the selected folder, as shown at operation 86.

It will be appreciated that, in the example embodiment shown in FIG. 2, the method may exclude the prioritizing functionality and that the user is provided with a participant list that has not been prioritized, and without the option of prioritizing the list. In this instance, the user selects any of the participants and is then provided with the target list associated with the selected participant. Also, a user may preset that e-mails associated with a particular participant must always be filed directly into a specific folder. For example, e-mails received from the users family are automatically saved in his "Personal—Family" folder.

Figure 4:
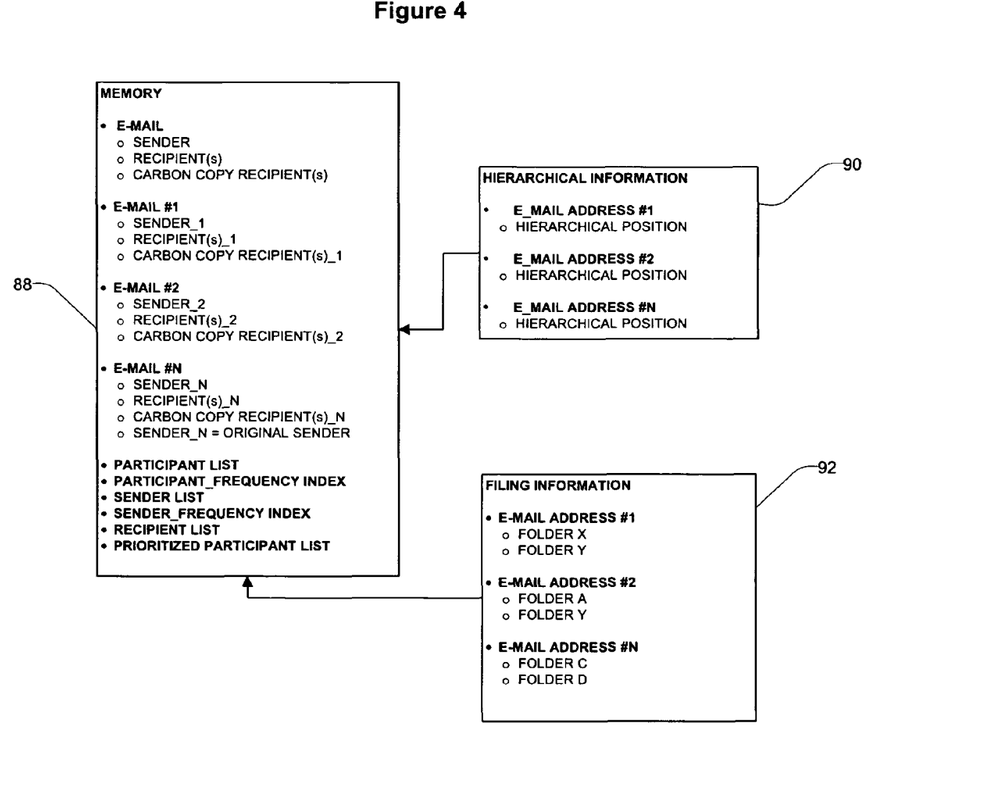
FIG. 4 is a block diagram illustrating the data architecture of information stored in memory and databases according to the example embodiment of FIGS. 3a and 3b.

Turning now to FIG. 4, the data structures of the memory and databases associated with an example embodiment of the invention are shown. The memory 88 of the file management application 14 stores data relating to each separate identified e-mail in the relayed e-mail. For example, for the most recently sent e-mail the sender, recipient (including carbon copy recipients) e-mail addresses are stored and linked to the e-mail. This information is extracted and stored for each e-mail (1, 2, 3 . . . N) identified from the different e-mail headers. The data structure also provides for the participant list, where each participant's e-mail address appears only once, but may be linked with an index detailing the frequency of the participation of the participant in the relayed e-mail. For example, if Participant 1's e-mail address has been extracted from the e-mail six times, this information is included in the participant list. The data structure also provides for a sender list (with a frequency index), a recipient list and a prioritized participant list.

The hierarchical information 90 contained in the database provides for e-mail addresses linked to hierarchical positions within a specific structure, such as a company. For example, tealady@address.com has a hierarchical position of "Support Staff", while bigboss@address.com has a hierarchical position of "Partner".

The filing information contained in the database, makes provision for linking e-mail addresses with different filing targets or e-mail folders. For example, friend@address.com may have the following folders associated with it: "New Business Venture", "Holiday" and "Personal—Other".

A practical example of an implementation of the invention is now described according to the following e-mail correspondence:

From: Jones, Tom
Sent: Monday, 27 Sep. 2004 5:18 PM
To: Andrews, Alice
Cc: Fisher, Fred; Brown, Bob
Subject: Strategic grant proposal
Hi Alice,
Please confirm this tomorrow morning from Fred. I believe we need Igor's budget approval before preparing an official "letter of support" for this project.
Cheers,
Tom
-----Original Message-----
From: Andrews, Alice
Sent: Monday, 27 Sep. 2004 4:23 PM
To: Brown, Bob
Cc: Fisher, Fred; Jones, Tom
Subject: RE: Strategic grant proposal
Hi Bob,
Sorry, it slipped my mind that Igor still needs to approve it. Because the budget is still pending approval from Igor, I'm guessing that we cannot confirm anything yet.
Tom, would you think this be right?
Cheers, Alice
-----Original Message-----
From: Brown, Bob
Sent: Monday, 27 Sep. 2004 4:07 PM
To: Andrews, Alice; Jones, Tom
Cc: Fisher, Fred
Subject: RE: Strategic grant proposal
Hi Alice,
Yes, they were hoping the get this by the end of the week.
Will that be possible?
Cheers, Bob
-----Original Message-----
From: Andrews, Alice
Sent: Monday, 27 Sep. 2004 4:04 PM
To: Brown, Bob; Jones, Tom
Cc: Fisher, Fred
Subject: RE: Strategic grant proposal
Hi Bob & Tom,
This was in the budget and thought this description below matched the 'project application form' attachment.
As far as the letter of approval goes, is that something that you require before Fred's return?
Cheers,
Alice
-----Original Message-----
From: Brown, Bob
Sent: Monday, 27 Sep. 2004 3:40 PM
To: Fisher, Fred
Cc: Jones, Tom; Andrews, Alice
Subject: FW: Strategic grant proposal
Hi Alice,
I've been working on the following grant application.
Basically it's reached a point where it needs a letter of approval from Fred.
Fred approved the work in principle, at least at the PIF stage.
I'm not sure if he's budgeted for it yet.
Could you chase this up for me and liaise with Tom?
Thanks, Bob.
-----Original Message-----
From: Peter Miller
Sent: Friday, 24 Sep. 2004 6:07 PM
To: Brown, Bob
Subject: Strategic grant proposal
Hi Bob
Here attached is the draft of the proposal. Basically, the next step is to get approval from Fred and a letter of support.
I thought I had a copy of a previous letter of support, but apparently I don't have any. In any case, Fred and Alice should have some templates or previous examples.
Cheers
Peter Example of a Typical Email Correspondence From the header of the e-mail and the e-mail body, the following participants are identified in the e-mail:

| | |
|---|---|
| Tom Jones: | Deputy Director |
| Alice Andrews: | Team Assistant |
| Bob Brown: | Staff Member |
| Fred Fisher: | Director |
| Peter Miller: | Customer |

From the e-mail it is determined that Peter started the email communication. Bob forwarded Peter's email to Fred, Tom, and Alice and so forth. Fred, as one of the final recipients of the e-mail, now wants to file the e-mail in one of his e-mail folders.

The e-mail is now parsed using the method described above. Considering the above e-mail, this e-mail contains the following metadata information:

A.from: The sender e-mail address of e-mail A (Tom Jones)

A.to: The recipient e-mail address of e-mail A (Alice Andrews)

A.Cc: A list of 1 or more recipients e-mail addresses of this email that received the e-mail as a carbon copy. (Fred Fisher and Bob Brown).

After the e-mail has been parsed, the above information is extracted from the header of the e-mail and stored in a participant list comprising the e-mail addresses of e-mail participants (name/e-mail address) of the e-mail.

Further we consider an e-mail header in the body of an e-mail. An example of such a header is again presented below:

| |
|---|
| From: <name/e-mail address> |
| Sent: <Time/Date time stamp> |
| To: <name/e-mail address> |
| Cc: <name/e-mail address> |
| Subject: <string> |

In order to extract all addressing information of participants from the e-mail body, the content of the e-mail is searched and all e-mail headers in the e-mail body are identified. For each e-mail header, the e-mail body is parsed to extract the participants listed under From, To, and Cc. These participants are then added to the participant list.

In an embodiment where the user is not provided with a list of prioritizing criteria, the user is provided with a list of the e-mail participants as depicted in the table below:

TABLE 1

Participant List

| |
|---|
| Please choose to which participant this e-mail relates most: |
| Tom Jones |
| Alice Andrews |
| Bob Brown |
| Fred Fisher |
| Peter Miller |

Should the participant list first be prioritized, the user is provided with a list of predetermined criteria to prioritize the participant list with. As described above, prioritizing criteria include the chronology of the e-mail senders, frequency of senders and hierarchical data associated with participants. Other prioritizing criteria may however also be incorporated in an example embodiment of this invention.

An example of a list of criteria to prioritize the participant list is shown in Table 2 below:

TABLE 2

Prioritizing criteria list

| | |
|---|---|
| Please choose the criteria for prioritizing the e-mail participant list | |
| | Original sender of e-mail |
| | Most recent sender of e-mail |
| | Sending frequency of participants |
| | Hierarchical positions of participants |

Upon selection of the preferred criteria, the participant list is prioritized accordingly.

The algorithm for prioritizing according to the original sender or most recent sender first determines a chronology of senders. This may typically be done by linking the time and date an e-mail was sent to the sender. Alternatively, the original sender may be identified by searching the e-mail body and identifying the e-mail header that is closest to the end of the text. The sender is then extracted by parsing the From field and storing it in memory. To identify the most recent sender of the e-mail (i.e. the final sender), it is necessary to look at the header of the e-mail. The prioritized participant list then incorporates either the original or most recent sender at the top position of the participant list.

The algorithm to identify the sender who has sent e-mail most frequently is similar to obtaining the list of participants. The e-mail header and body are searched to obtain only information from the From field. Each participant (sender in this instance) identified is stored in the memory if the participant is not already contained therein. If the participant is already stored in the memory, an index associated with the participant is incremented by 1. After parsing the e-mail and extracting the relevant information, the participants are sorted according to the index, which leaves the participant with the highest number of occurrences, e.g., the participant who sent the most e-mails at the top.

To prioritize the participant list according to hierarchical information related to each participant, a database is accessed and for each participant the participant's ranking is obtained and linked. An example of such a database is the LDAP directory. It will be appreciated that this ranking can be extended to only look at the senders in the participant list. This then provides a hierarchical sender participant list.

Once the relevant prioritized list is provided to the user, the user selects the preferred participant, e.g. the participant most relevant to the e-mail, according to the user.

The user is then provided with the e-mail target list associated with the participant, an example of which is shown below:

TABLE 3

List of Potential Target Folders

| | |
|---|---|
| Potential target folders for this e-mail | |
| | Partners |
| | Strategic Projects |
| | Budget |
| | Action Items |
| | For Review |

This list is created by associating previously filed e-mails relating to the participants with specific folders.

Upon selection of one of the target folders from this list, the e-mail is filed. If there is no suitable choice given, then the user simply files the e-mail as the user would have done without this tool.

Figure 5:
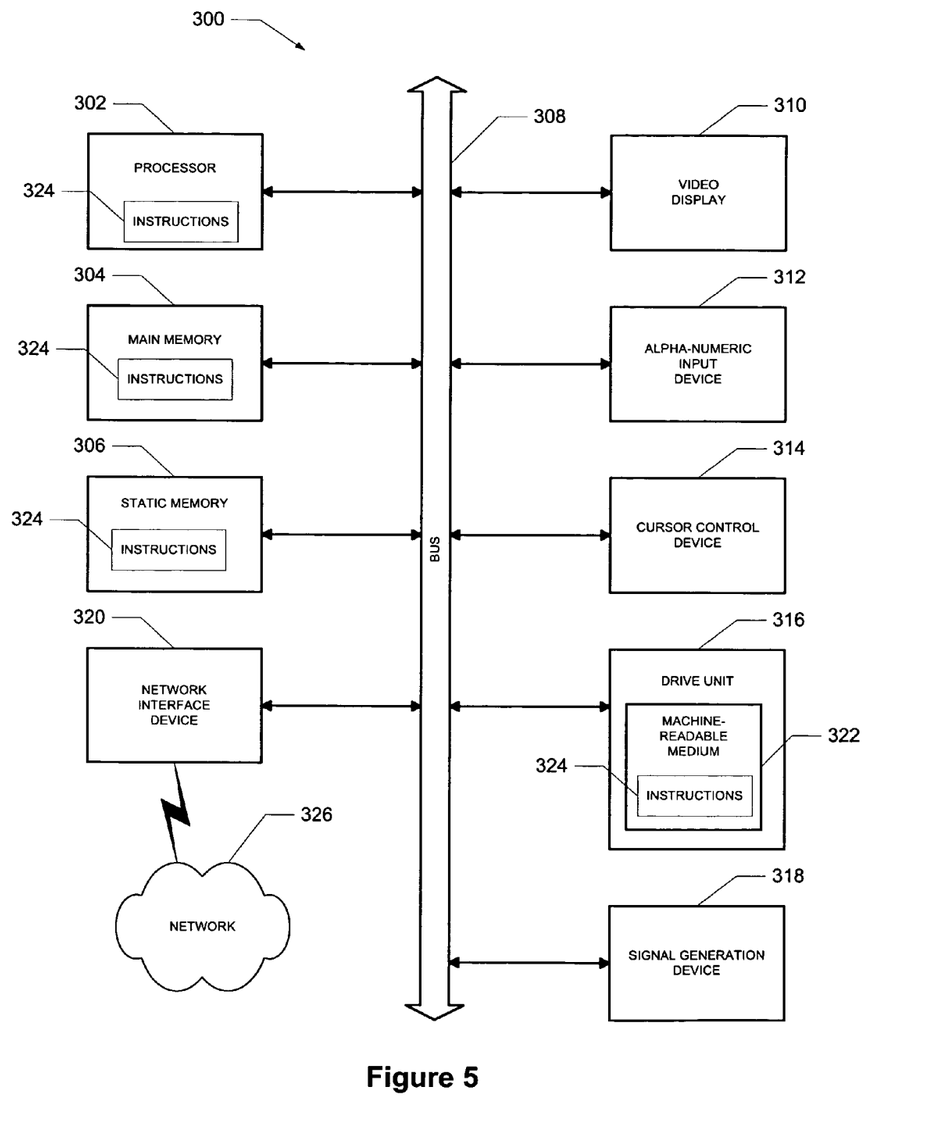
FIG. 5 is a block diagram showing a machine for performing any one of the exemplary methods described herein.

FIG. 5 shows a diagrammatic representation of machine in the exemplary form of a computer system 300 within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 300 includes a processor 302 (e.g., a central processing unit (CPU) a graphics processing unit (GPU) or both), a main memory 304 and a static memory 306, which communicate with each other via a bus 308. The computer system 300 may further include a video display unit 310 (e.g., a liquid crystal display (LCD) or a cathode ray tube (CRT)). The computer system 300 also includes an alphanumeric input device 312 (e.g., a keyboard), a cursor control device 314 (e.g., a mouse), a disk drive unit 316, a signal generation device 318 (e.g., a speaker) and a network interface device 320.

The disk drive unit 316 includes a machine-readable medium 322 on which is stored one or more sets of instructions (e.g., software 324) embodying any one or more of the methodologies or functions described herein. The software 324 may also reside, completely or at least partially, within the main memory 304 and/or within the processor 302 during execution thereof by the computer system 300, the main memory 304 and the processor 302 also constituting machine-readable media.

The software 324 may further be transmitted or received over a network 326 via the network interface device 320.

While the machine-readable medium 322 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present invention. The term "machine-readable medium" shall accordingly be taken to include, but not be limited to, solid-state memories, optical media and magnetic media.

Thus, a method and system to file relayed e-mails have been described. Although the present invention has been described with reference to specific exemplary embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A system to file relayed e-mails, the system including:
a parsing module to parse a relayed e-mail to obtain addressing information from an e-mail header and body, and to extract the addressing information from the parsed relayed e-mail;
a memory to store the addressing information;
a participant list module to generate a participant list from the stored addressing information, and to provide the participant list to a user to enable the user to select a participant from the participant list, the participant list generated after the addressing information has been obtained and extracted from the relayed e-mail and including a plurality of participants; and
a filing module to file the relayed e-mail based on the selected participant,
the parsing module, the participant list module and the filing module including computer instructions executed by at least one computer processor.

2. The system of claim 1, wherein the participant list module is to provide the participant list to enable the user to select a participant with which content of the relayed e-mail is most closely associated.

3. The system of claim 1, wherein the filing module is to provide a target list of filing targets for the relayed e-mail, the target list being based on the selected participant.

4. The system of claim 3, wherein the filing module is to select the filing targets of the target list from a set of filing targets previously selected by the user for the filing of relayed e-mails associated with the selected participant.

5. The system of claim 3, wherein the target list comprises a list of folders maintained in the system for the filing of relayed e-mails.

6. The system of claim 1, wherein the addressing information includes at least a sender and recipient's e-mail address obtained from the header of the relayed e-mail and at least a sender and recipient's e-mail address obtained from at least one header of a previously sent and relayed e-mail located in the e-mail body.

7. The system of claim 6, further including a first database containing hierarchical information linked to addressing information.

8. The system of claim 6, further including a second database containing filing information linked to addressing information.

9. The system of claim 1, further including a prioritizing module to prioritize the stored addressing information.

10. A method to file relayed e-mails, the method including:
using one or more computer processors for receiving an e-mail, the e-mail including addressing information in an e-mail header and an e-mail body;
parsing the e-mail to obtain addressing information from the e-mail header and the e-mail body;
extracting the addressing information from the parsed e-mail;
storing the addressing information;
generating a participant list from the extracted addressing information, the participant list including a plurality of participants prioritized according to a predetermined criterion;
providing the participant list to a user to enable the user to select a participant from the participant list; and
filing the e-mail based on the selected participant.

11. The method of claim 10, wherein the addressing information includes at least a sender and recipient's e-mail address obtained from the header of the e-mail and at least a sender and recipient's e-mail address obtained from at least one header of a previously sent and relayed e-mail located in the e-mail body.

12. The method of claim 11 further including receiving a selected criteria selection from the user.

13. The method of claim 12 including identifying a chronology of senders in the e-mail, and prioritizing the participant list according to the chronology.

14. The method of claim 12 including providing a high priority, within the participant list, to a more recent sender in the chronology of senders.

15. The method of claim 12, including providing a high priority, within the participant list, to an original sender in the chronology of senders.

16. The method of claim 12 including identifying a sending frequency for each sender in the e-mail, and prioritizing the participant list according to the sending frequencies of the respective senders.

17. The method of claim 12 further including accessing a database containing hierarchical data linking the e-mail addresses stored in the memory to hierarchical positions and prioritizing the participant list according to this hierarchical data.

18. The method of claim 12 wherein the participant list provided to the user is a prioritized participant list.

19. The method of claim 11 including receiving a selected participant selection from the user.

20. The method of claim 19 further including accessing a second database containing filing information associated with the selected participant and linking the associated filing information with the addressing information of the selected participant.

21. The method of claim 20 wherein the filing information is a list of e-mail folders associated with the selected participant.

22. The method of claim 21 further including providing the list of e-mail folders associated with the selected participant to the user.

23. The method of claim 22 further including receiving an e-mail folder selection from the user and associating the e-mail with the selected folder.

24. The method of claim 10 further including providing the user with a list of pre-determined criteria for prioritizing the participant list.

25. A non-transitory machine-readable medium comprising instructions, which when executed by a machine, cause the machine to perform the method of claim 10.

26. A system to file relayed e-mails, the system including:
parsing means for parsing an e-mail to obtain addressing information from an e-mail header and body, and extracting the addressing information from the parsed e-mail;
storage means for storing the addressing information;
information generating means for generating a participant list from the stored addressing information, and providing the participant list to a user to enable the user to select a participant from the participant list, the participant list having a plurality of participants including at least one e-mail sender and one e-mail recipient; and
filtering means for filing the e-mail based on the selected participant.

27. The system of claim 26, wherein the third means is for providing the participant list to enable the user to select a participant with which content of the e-mail is most closely associated.

28. The system of claim 26, wherein the fourth means is for providing a target list of filing targets for the e-mail, the target list being based on the selected participant.

29. The system of claim 28, wherein the fourth means is for selecting the filing targets of the target list from a set of filing targets previously selected by the user for the filing of e-mails associated with the selected participant.

30. The system of claim 28, wherein the target list comprises a list of folders maintained in the system for the filing of e-mails.

31. The system of claim 26, wherein the addressing information includes at least a sender and recipient's e-mail address obtained from the header of the e-mail and at least a sender and recipient's e-mail address obtained from at least one header of a previously sent and relayed e-mail located in the e-mail body.

32. The system of claim 31, further including sixth means containing hierarchical information linked to addressing information.

33. The system of claim 31 further including seventh means containing filing information linked to addressing information.

34. The system of claim 26, further including fifth means for prioritizing the stored addressing information.

* * * * *